US010434560B2

(12) United States Patent
Gray et al.

(10) Patent No.: US 10,434,560 B2
(45) Date of Patent: Oct. 8, 2019

(54) FLUID CONDUIT COVER INSTALLATION DEVICES, SYSTEMS AND METHODS

(71) Applicant: THE GATES CORPORATION, Denver, CO (US)

(72) Inventors: Yelena Gray, Parker, CO (US); Martin K. Bauer, Littleton, CO (US)

(73) Assignee: Gates Corporation, Denver, CO (US)

( * ) Notice: Subject to any disclaimer, the term of this patent is extended or adjusted under 35 U.S.C. 154(b) by 709 days.

(21) Appl. No.: 14/091,982

(22) Filed: Nov. 27, 2013

(65) Prior Publication Data

US 2014/0150516 A1 Jun. 5, 2014

Related U.S. Application Data

(63) Continuation of application No. 12/657,277, filed on Jan. 14, 2010, now Pat. No. 8,631,676.

(Continued)

(51) Int. Cl.
 *B21D 39/04* (2006.01)
 *B29C 67/00* (2017.01)
 (Continued)

(52) U.S. Cl.
 CPC .............. *B21D 39/046* (2013.01); *B21J 5/06* (2013.01); *B29C 67/0014* (2013.01);
 (Continued)

(58) Field of Classification Search
 CPC .... B21C 1/22; B21C 1/34; B21C 3/08; B21C 3/16; B21C 37/10; B21C 37/20;
 (Continued)

(56) References Cited

U.S. PATENT DOCUMENTS

| 2,286,197 A | 6/1942 | Claybaugh |
| 3,055,412 A | 9/1962 | Dibner |
(Continued)

FOREIGN PATENT DOCUMENTS

| CN | 2860660 Y | 1/2007 |
| DE | 102006006993 A1 | 8/2007 |
(Continued)

OTHER PUBLICATIONS

European Patent Office, International Search Report for International Application No. PCT/US2010/000106, dated Sep. 23, 2010.

*Primary Examiner* — Teresa M Ekiert
(74) *Attorney, Agent, or Firm* — Paul N. Dunlap, Esq.

(57) ABSTRACT

An embodiment for disposing a sleeve on a fluid conduit includes positioning a sleeve through lead rollers, pressing sleeve edges to flatten the sleeve against its normal geometry, aligning the flattened sleeve with opposing guide channels defined in an passage through a sleeve guide, feeding the sleeve through the passage, and compressing the sleeve in the passage, letting the edges of the sleeve ride against the guide channels to open the sleeve. A length of the compressed sleeve exiting the guide may be cut using a heated device that fuses the sleeve material, leaving the sleeve clear to receive a fluid conduit. A collar may be disposed around an end of the cut sleeve and over the conduit, then compressed, with an end of the sleeve captured between the collar and end of the conduit. This compressing may define at least one raised portion in the collar.

18 Claims, 11 Drawing Sheets

Related U.S. Application Data

(60) Provisional application No. 61/205,057, filed on Jan. 14, 2009.

(51) Int. Cl.

| | | |
|---|---|---|
| *F16L 11/04* | (2006.01) | |
| *F16L 55/18* | (2006.01) | |
| *B21J 5/06* | (2006.01) | |
| *F16L 57/00* | (2006.01) | |
| *B29C 53/08* | (2006.01) | |

(52) U.S. Cl.
CPC .............. *F16L 11/042* (2013.01); *F16L 55/18* (2013.01); *F16L 57/005* (2013.01); *B29C 53/086* (2013.01); *Y10T 29/49908* (2015.01)

(58) Field of Classification Search
CPC .......... B21C 37/30; B21D 7/08; B21D 7/085; B21D 9/14; B21D 13/00; B21D 13/04; B21D 13/06; B21D 13/08; B21D 15/12; B21D 39/04; B21D 39/046; B21D 39/048; B21D 41/00; B21D 41/023; B21D 53/08; B21D 9/10; B21D 9/125; B29C 53/086
USPC .......................................................... 72/274
See application file for complete search history.

(56) References Cited

U.S. PATENT DOCUMENTS

| | | |
|---|---|---|
| 3,144,070 A | 8/1964 | Mieszcak |
| 3,257,836 A * | 6/1966 | Huet ........................ B21C 37/20 |
| | | 72/451 |
| 3,713,323 A * | 1/1973 | Ivanier .................... F16B 33/02 |
| | | 72/274 |
| 3,782,164 A * | 1/1974 | Felker ........................ B21C 3/04 |
| | | 72/274 |
| 3,906,619 A | 9/1975 | Shaffer |
| 5,916,319 A * | 6/1999 | Yoshino .................... B21D 7/08 |
| | | 72/159 |
| 6,026,555 A | 2/2000 | Sager |
| 6,234,000 B1 | 5/2001 | Bowling |
| 6,604,403 B1 | 8/2003 | Eslambolchi et al. |
| 7,077,149 B2 | 7/2006 | Kalley et al. |
| 7,237,415 B2 * | 7/2007 | Wu ............................ B21B 1/12 |
| | | 72/206 |
| 7,409,847 B2 | 8/2008 | Wightman et al. |
| 7,836,740 B2 | 11/2010 | Launius, Jr. |
| 8,161,620 B2 | 4/2012 | Ficker et al. |
| 8,561,647 B2 | 10/2013 | Gray |
| 2001/0000564 A1 | 5/2001 | Bowling |

FOREIGN PATENT DOCUMENTS

| | | |
|---|---|---|
| GB | 1169287 A | 11/1969 |
| JP | 05111961 A | 5/1993 |
| WO | 96/06707 A1 | 3/1996 |

* cited by examiner

FLUID CONDUIT COVER INSTALLATION DEVICES, SYSTEMS AND METHODS

CROSS-REFERENCE TO RELATED APPLICATION

This application is a continuation of U.S. application Ser. No. 12/657,277, filed Jan. 14, 2010, which claims the benefit of U.S. Provisional Application No. 61/205,057, filed Jan. 14, 2009, all entitled Fluid Conduit Cover Installation Devices, Systems and Methods, which is also incorporated herein by reference. Mention is also made of related U.S. application Ser. No. 12/657,238, filed Jan. 14, 2010, with the same title, now abandoned.

BACKGROUND OF THE INVENTION

Field of the Invention

The present invention relates generally to pressurized conduits such as hoses and tubes, more particularly to devices, systems and methods for installing sleeve and collar safety assemblies that encloses the length of a high pressure conduit sleeves to protect against human injury and loss of life due to catastrophic failures in the form of bursts or pin-hole failures in such high pressure fluid conduits.

Description of the Prior Art

As is well known within the hydraulics industry, injury resulting from hose bursts and pin-hole leaks can occur in a matter of milliseconds. Hydraulic systems may operate at very high pressures and a leak of pressurized fluid can penetrate the skin, causing severe tissue damage and burns. ISO 3457, EN474-1, and similar so called "line of sight" protection standards or guidelines state that for hoses carrying material (a fluid) at a pressure of 725 pounds per square inch (psi) or higher, wherein the hose assembly is located within one meter of an operator, or if the material carried within the hose exceeds 50 degrees Celsius, protection is required.

SUMMARY

The present invention is directed to devices, systems and methods for installing sleeve and collar safety assemblies that enclose the length of a high pressure conduit to protect against human injury and loss of life due to catastrophic failures in the form of bursts or pin-hole failures in such high pressure fluid conduits.

Related U.S. Provisional Application No. 61/068,538, filed Mar. 7, 2008, and U.S. application Ser. No. 12/290,172, filed Oct. 28, 2008, both entitled "Safety and Indication Apparatus, Systems and Methods for High Pressure Conduits," are both incorporated herein by reference. These applications disclose safety and indication apparatus, systems and methods for high pressure conduits, which provide operator protection, and preferably a warning, after a high pressure conduit has incurred damage in the form of a burst, pin-hole failure, or other damage. Conduit systems disclosed in these applications comprise a high pressure conduit, with an impervious fabric sleeve disposed over the conduit. A coupling, or the like is typically disposed on each end of such a conduit and a collar may be disposed on each end of the sleeve. The collar may be compressed to secure the end of the sleeve between the collar and a ferrule that secures the coupling in the end of the conduit. This compression also preferably defines ends of a fluid channel, defined by an interstitial space between the conduit and the sleeve. The present inventive devices, systems and methods are directed to installing such sleeve and collar safety assemblies.

In accordance with embodiments of the present invention a sleeve installation guide might comprise a body defining a generally symmetrical sleeve receptive passage therethrough. The passage preferably comprises a transverse elongated slot with guide channels defined in a top and a bottom of the passage. The passage may be flared at an entrance opening of the guide and is preferably tapered from the entrance of the guide to an outlet of the guide.

A method for handling a sleeve in accordance with the present invention might include pressing against "edges" of flat sleeve stock, to flatten it in the opposite direction of its natural shape. Then the re-shaped sleeve stock may be further flattened with a sleeve guide, such as by aligning flattened edges of the sleeve stock with guide channels defined in the top and bottom of a passage through a body of the guide, to push the edges of the sleeve stock toward each other. The sleeve stock is fed into the opening of the sleeve guide, compressing the sleeve and allowing the edges of the sleeve to ride against the guide channels. The compressed sleeve exiting the guide may be cut using a heated device that fuses the material comprising the sleeve stock. The aforementioned edges of the sleeve stock may be one or two longitudinal seams of the sleeve or longitudinal folds or creases of the sleeve.

Hence, a method for disposing a sleeve on a fluid conduit might include positioning a sleeve through lead rollers, pressing sleeve edges together to flatten the sleeve against its normal geometry, aligning the flattened sleeve with opposing guide channels defined in an passage through a sleeve guide, feeding the sleeve stock through the passage, and compressing the sleeve in the passage, letting the edges of the sleeve ride against the guide channels to open the sleeve. A length of the compressed sleeve exiting the guide may be cut using a heated device that fuses the material comprising the sleeve stock around a circumference of the sleeve, leaving an inside of the sleeve clear to receive fluid conduit. Thereafter, a collar may be disposed around an end of the cut sleeve and over the conduit, then compressed, with an end of the sleeve captured between the collar and end of the conduit. As mentioned, this compressing preferably defines at least one raised portion in the collar.

Thus, in accordance with the present invention, a system for installing a fluid conduit cover might include a sleeve guide comprising a body defining a generally symmetrical sleeve receptive passage therethrough. The passage might comprise a transverse elongated slot with opposing guide channels defined in the passage. A plurality of lead rollers or guide pins may be positioned at predetermined distances from the guide, aligning the sleeve, with edges of the sleeve indexed with the guide channels, opening the sleeve as the sleeve is passed through the guide. Preferably, the rollers/pins and guide are mounted on a tabletop or similar structure. A spool may be used to provide sleeve stock to the system. Also, as mentioned above, a heated device, such as a heat knife, may be employed to cut a length of the sleeve and fuse the material comprising the sleeve. Further, a press may be used in embodiments of this system for compressing a collar with an end of the sleeve captured between the collar and the conduit, or a coupling disposed on an end of the conduit.

Such a press might employ complementary dies which define at least one raised portion in the collar providing a fluid flow passage from an interstitial space between the conduit and the sleeve. Thrust plates may be indexed between the dies. These thrust plates may operate to help define and retain the aforementioned collar raised portions. The press might be a mechanically operated press employing mechanical leverage to compress the dies. In such an embodiment, a torque calibrated handle, similar to a torque wrench, may be used to operate the press, in order to monitor the degree of compression applied to the collar. Alternatively, and in some cases preferably a hydraulic press might be used to compress the dies.

Regardless, embodiments of a die set for compressing a collar with an end of the sleeve captured between the collar and the conduit, or a coupling disposed on an end of the conduit in accordance with the present systems and methods preferably employs a dies set comprising complementary dies which define at least one raised portion in the collar providing a fluid flow passage from an interstitial space between the conduit and the sleeve. Such dies may be indexed with one another using a thrust plate or the like.

Thus, in accordance with embodiments of the present invention a die set for completing assembly of a safety hose sleeve system might include an upper die having an upper curved compressive face and a pair of upper recess walls, one extending contiguous from the upper compressive face at a reflex angle to the upper compressive face at each end of the upper compressive face. Each of these upper recess walls defines an upper wall of a cavity at each end of the upper compressive face. The upper die also comprises a pair of upper thrust plate slots, each extending upward from an end of each of the upper recess walls, distal from the upper compressive face. The die set also preferably includes a lower die defining a lower curved compressive face and a pair of lower recess walls, one extending contiguous from the lower compressive face at a reflex angle to the lower compressive face at each end of the lower compressive face. Each of these lower recess walls defines a lower wall of a cavity at each end of the lower compressive face. The lower die also comprises a pair of lower thrust plate slots, each extending downward from an end of each of the lower recess walls, distal from the lower compressive face. A thrust plate extends from each lower thrust plate slot into the corresponding upper thrust plate slot, across each cavity at an acute angle to each of the recess walls, defining an outer abutment of the cavity.

Each of the dies may be slideably disposed on a pair of spaced apart fasteners, such as through-bolts, and a spring may be disposed on each of the fasteners, between the dies, spring biasing the dies apart. The thrust plates are preferably of a sufficient length that they each extend between the dies when the dies are biased apart, but short enough to allow the dies to meet. The die set may be mounted to a base plate for ease of use with a press.

Thus a method for completing assembly of a safety hose sleeve system might include disposing a collar, which is disposed over the end of the safety sleeve which in turn is disposed over a fluid conduit, between curved compressive faces of a pair of spaced apart dies of a die set. The collar is then compressed with at least one portion of the collar compressed by the curved compressive faces to capture an end of the sleeve between the collar and an end of the conduit. However, preferably, opposite portions of the collar are compressed, each capturing an opposite side of the sleeve between the collar and an end of the conduit. Regardless, at least one other portion of the collar is pressed into a cavity defined by the dies coming together to form at least one raised portion in the collar that provides a fluid flow path from an interstitial space defined between the sleeve and the conduit. However, preferably, opposite portions of the collar form oppositely disposed raised portions in the collar to provide fluid flow paths from an interstitial space defined between the sleeve and the conduit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The present devices, systems and methods may be used to install a sleeve and collar safety assembly that encloses the length of a high pressure conduit to protect against human injury and loss of life due to catastrophic failures in the form of bursts or pin-hole failures in such high pressure fluid conduits. These sleeve and collar assemblies act as a safety and indication apparatus or system for the high pressure conduits. These conduit systems comprise a high pressure conduit, with an impervious sleeve disposed over the conduit. A coupling, or the like is typically disposed on each end of such a conduit and a collar may be disposed on each end of the sleeve. In accordance with embodiments of the present invention the collar may be compressed to secure the end of the sleeve between the collar and a ferrule that secures the coupling in the end of the conduit. This compression also preferably defines ends of a fluid channel, defined by an interstitial space between the conduit and the sleeve.

Figure 1:
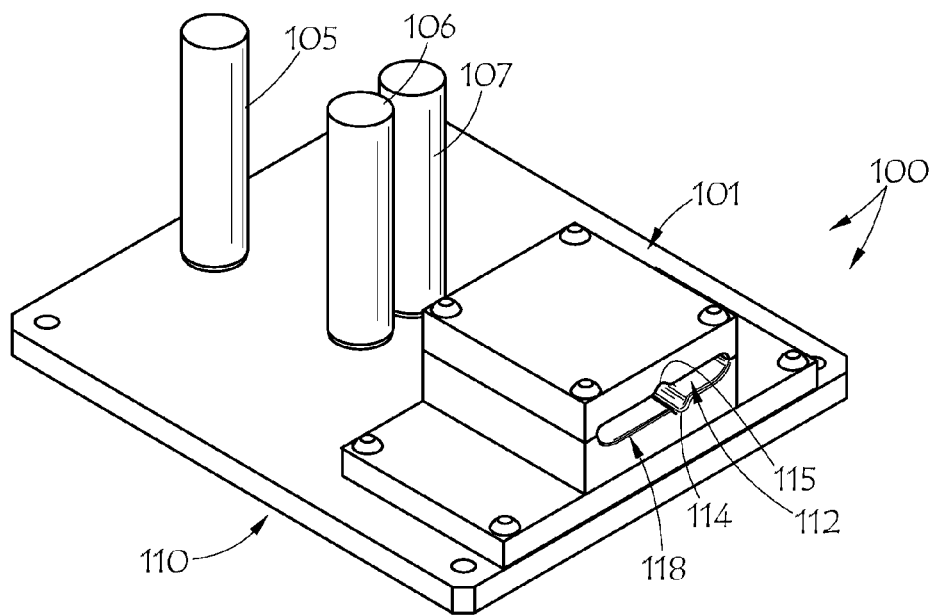
FIG. 1 is a perspective view of an embodiment of a fluid conduit cover installation system employing a guide and rollers mounted on a table top.
Figure 2:
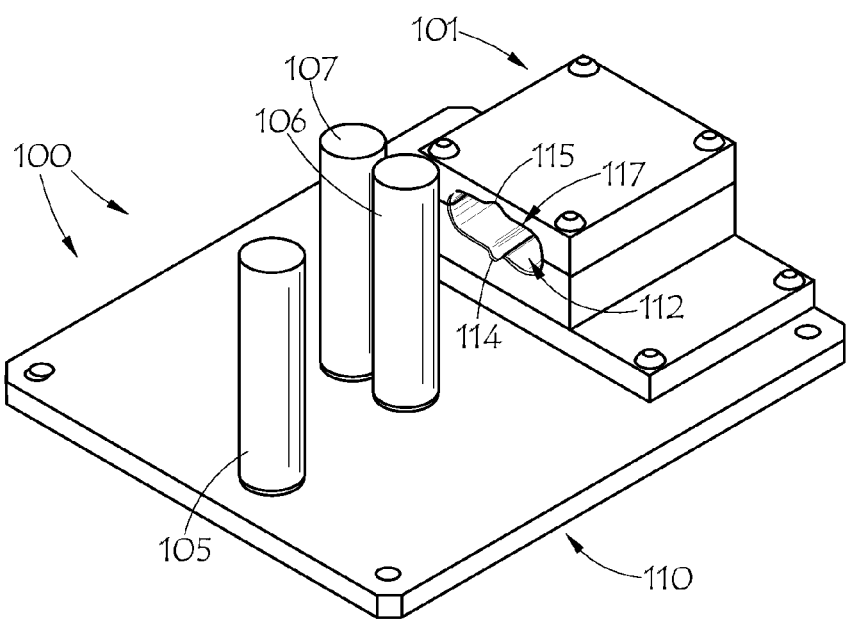
FIG. 2 is another perspective view of the system embodiment of FIG. 1.

FIGS. 1 and 2 are perspective views of an embodiment of fluid conduit cover installation system 100 employing guide 101 and rollers 105-107 mounted on surface or table top 110. Sleeve guide 101 preferably comprises a body, which defines generally symmetrical sleeve receptive passage 112 therethrough. The passage might take the form of a transverse elongated slot with opposing guide channels 114 and 115 defined in the passage, preferably in the bottom and the top of the passage. Passage 112 may be flared at entrance opening 117 and is preferably tapered from entrance 117 to outlet 118.

Figure 3:
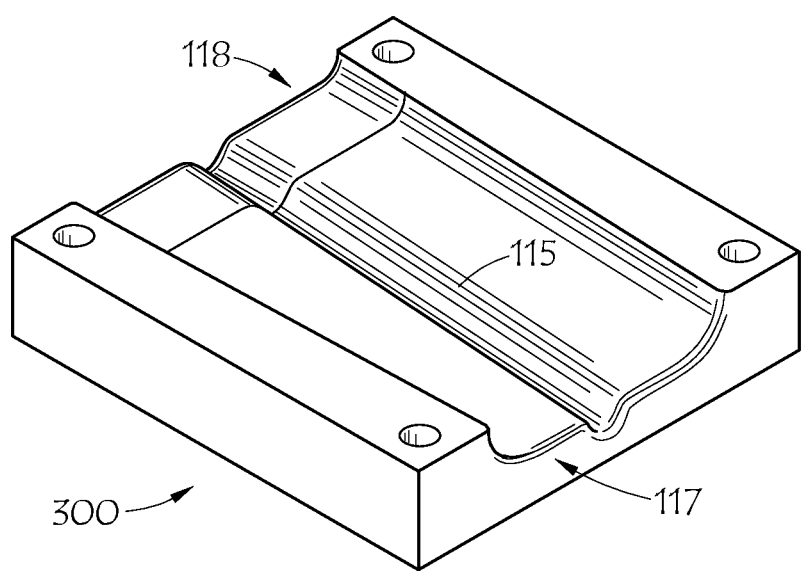
FIG. 3 is a perspective view of a top half of a sleeve guide.
Figure 4:
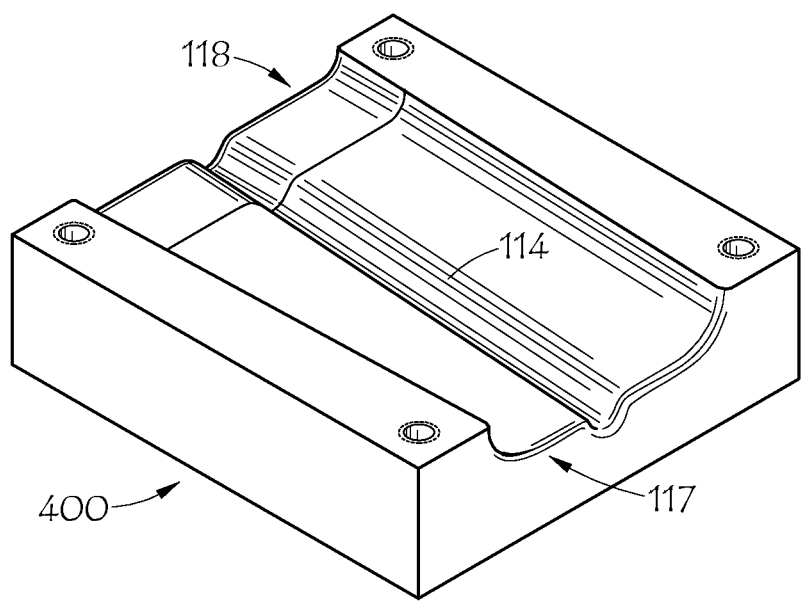
FIG. 4 is a perspective view of a bottom half of a sleeve guide.
Figure 5:
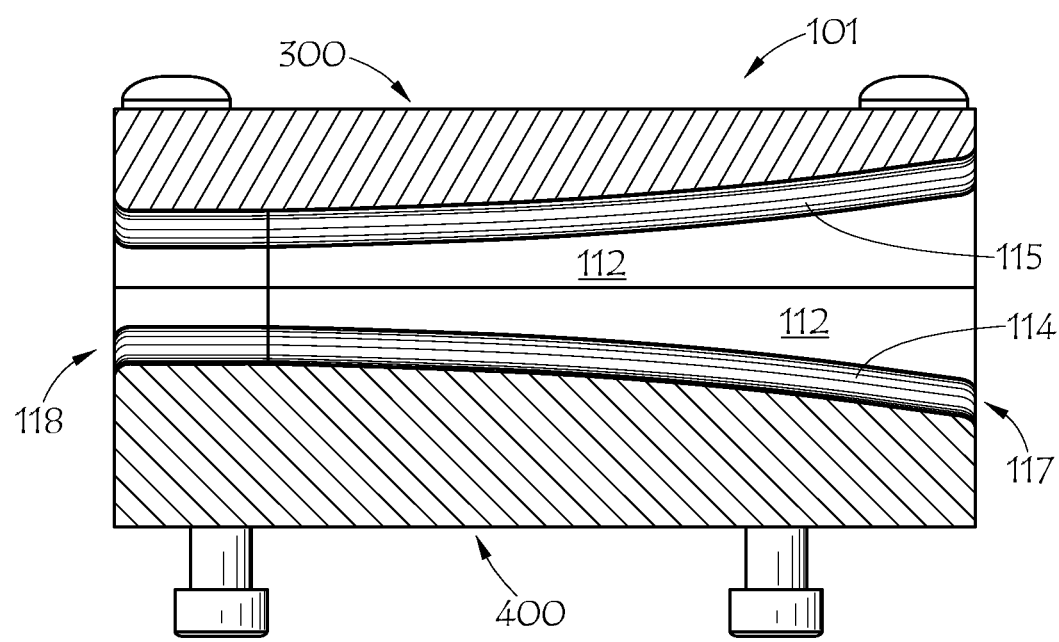
FIG. 5 is a fragmented, generally cross-sectional, view of a sleeve guide assembled from the halves shown in FIGS. 3 and 4.
Figure 12:
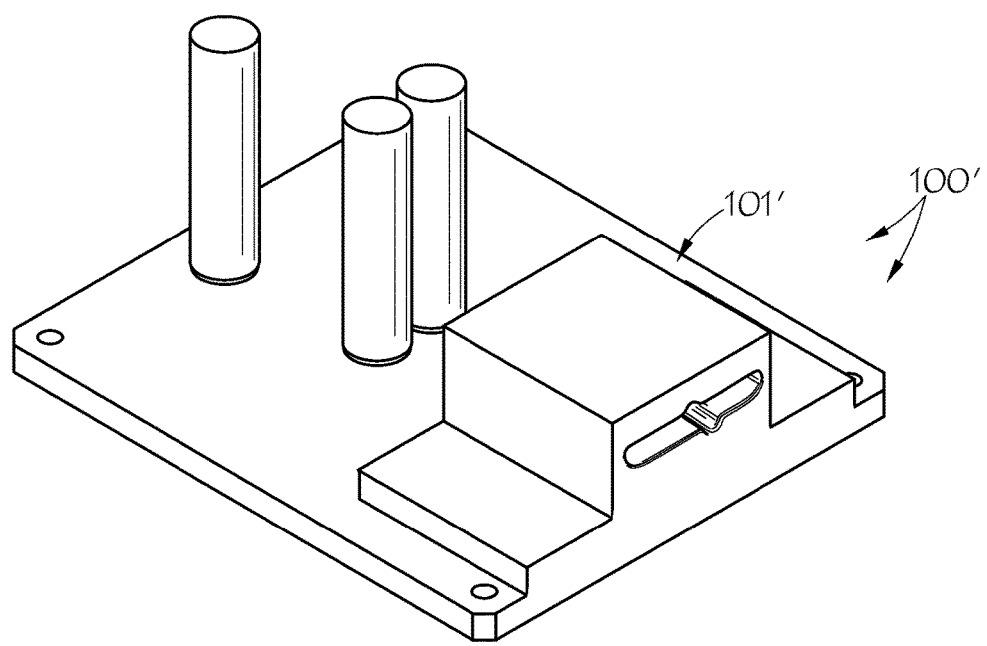
FIG. 12 is another embodiment of a fluid conduit cover installation system.

As shown in greater detail in FIGS. 3, 4 and 5, the body of sleeve guide 101 may be formed from two, generally symmetrical halves 300 and 400. FIG. 3 is a perspective view of top half 300 of sleeve guide 101, while FIG. 4 is a perspective view of bottom half 400 of sleeve guide 101. FIG. 5 is a fragmented, generally cross-sectional view of sleeve guide 10, such as it may be assembled from halves 300 and 400 of FIGS. 3 and 4. While shown in the drawings as comprising generally symmetrical top and bottom halves, the body of a sleeve guide of the present invention could clearly be defined in any number of manners, such as from a single piece of material, as illustrated by sleeve guide 101' and system 100' in FIG. 12, or from any number of split parts bolted or otherwise secured together. The guide may be made from any number of materials using any number of methods or process. For example, the guide may be machined, cast or forged from metal, or molded from a somewhat rigid plastic.

Figure 6:
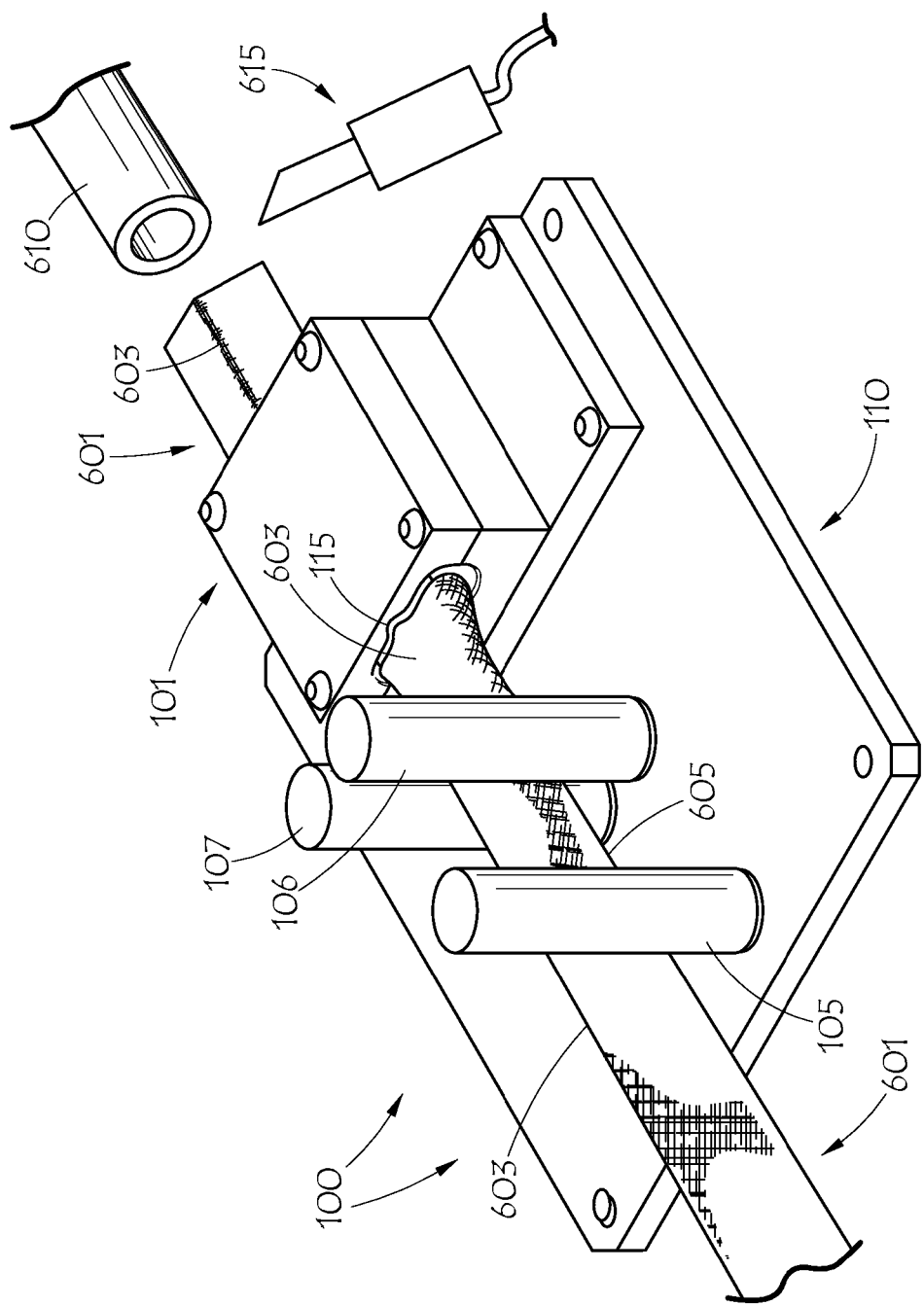
FIG. 6 is a fragmented perspective view of a the embodiment of a fluid conduit cover installation system shown in FIGS. 1 and 2 with a length of hose sleeving shown feed through the rollers and guide.
Figure 7:
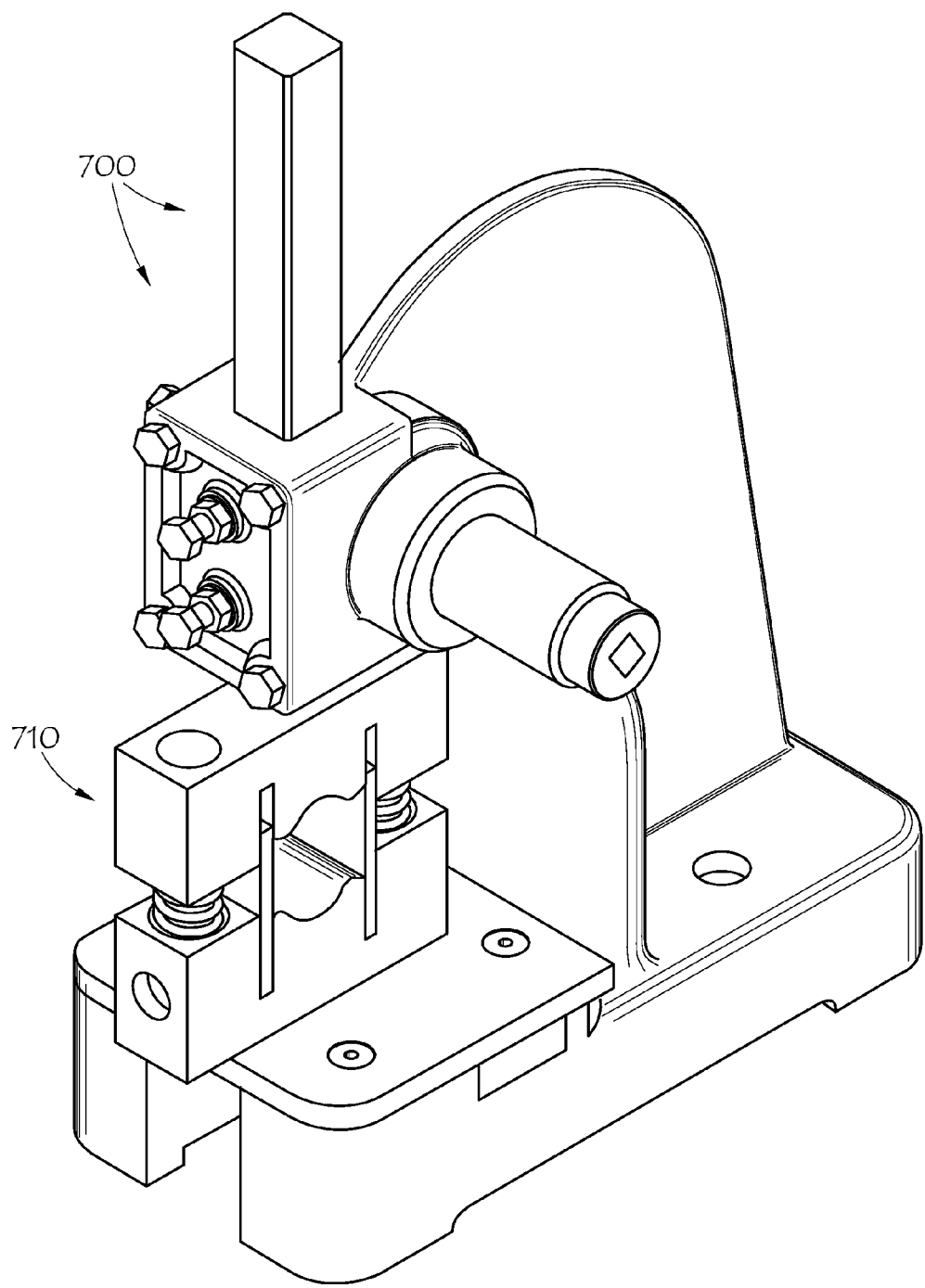
FIG. 7 is a perspective view of an embodiment of a manually operated press for use in a fluid conduit cover installation system or method.
Figure 8:
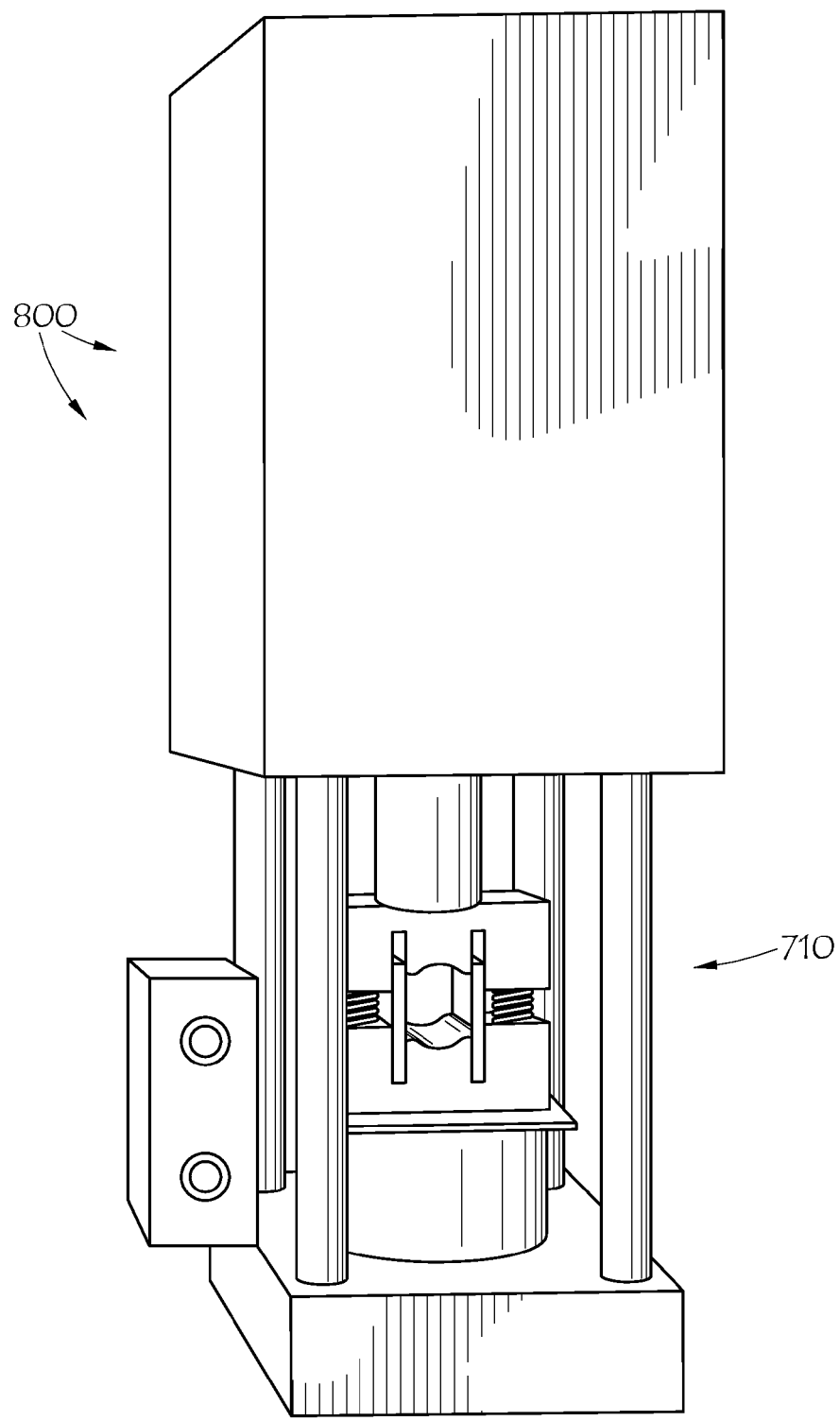
FIG. 8 is a perspective view of an embodiment of a hydraulic press for use in a fluid conduit cover installation system or method.

As noted, system 100, might also employ a set or plurality of lead rollers or guide pins (105-107), positioned at predetermined distances from guide 101. As best seen in FIG. 6, pins 105-107 preferably align sleeve 601, with edges 603 and 605 of sleeve 601 indexed with guide channels 114 and 115, opening sleeve 601 as it is passed through guide 101 for deployment on conduit 610.

Preferably, rollers/pins 105-107 and guide 101 are mounted on a tabletop 110 or similar structure. Which may provide threaded orifices, or analogous mechanisms, for securing pins 105-107, guide 101 and possibly other system elements to the tabletop in a desired spatial arrangement. A spool (not shown) may be used to provide sleeve stock to the system. Also, as mentioned above, a heated device 615, such as a heat knife, may be employed to cut a length of the sleeve and fuse the material comprising the sleeve.

With attention directed to FIG. 6, an embodiment of fluid conduit cover installation system 100 of FIGS. 1 and 2 is shown practicing a method for handling sleeve 601 in accordance with the present invention, such as to dispose sleeve 601 on fluid conduit 610. Sleeve 601 is positioned in and run through a series of rollers 105-107 to provide tension on sleeve 601 and to keep it in a vertical position before flattening. Optionally, a small metal or plastic ball (not visible) may be inserted inside sleeve 601, preferably after rollers 106 and 107, to help break apart any filaments that may occasionally hold sleeve 601 closed. Exiting rollers 106 and 107, edges 603 and 605 of sleeve stock 601 are pressed toward one another to flatten the sleeve against its normal geometry, and the flattened sleeve is fed into sleeve guide 101, with top edge 603 aligned with top channel 115 of sleeve guide 101 and bottom edge 605 aligned with bottom guide channel 114. Edge 603 and/or 605 of the sleeve stock may be a longitudinal seam of the sleeve and/or a longitudinal fold or crease of the sleeve. Sleeve stock 601 is fed into opening 117 of sleeve guide 101, allowing the edges of the sleeve to ride against guide channels 114 and 115 as it is fed or drawn through guide 101, compressing the sleeve. Feeding sleeve stock 601 through guide passage 112 compresses the sleeve in the passage, with edges 603 and 605 of sleeve 601 riding against guide channels 114 and 115, opens the sleeve. The opened sleeve exiting guide outlet 118 may be cut to a desired length using heated cutting device 615 that fuses the material comprising sleeve stock 601 around a circumference of the sleeve, leaving an inside of the sleeve clear to receive fluid conduit 610. Thereafter, as discussed in greater detail below a collar may be disposed around an end of the cut sleeve and over conduit 610, then compressed, with an end of sleeve 601 captured between the collar and end of conduit 610. This compressing preferably defines at least one raised portion in the collar providing a fluid flow path from an interstitial space between conduit 610 and sleeve 601.

Figure 9:
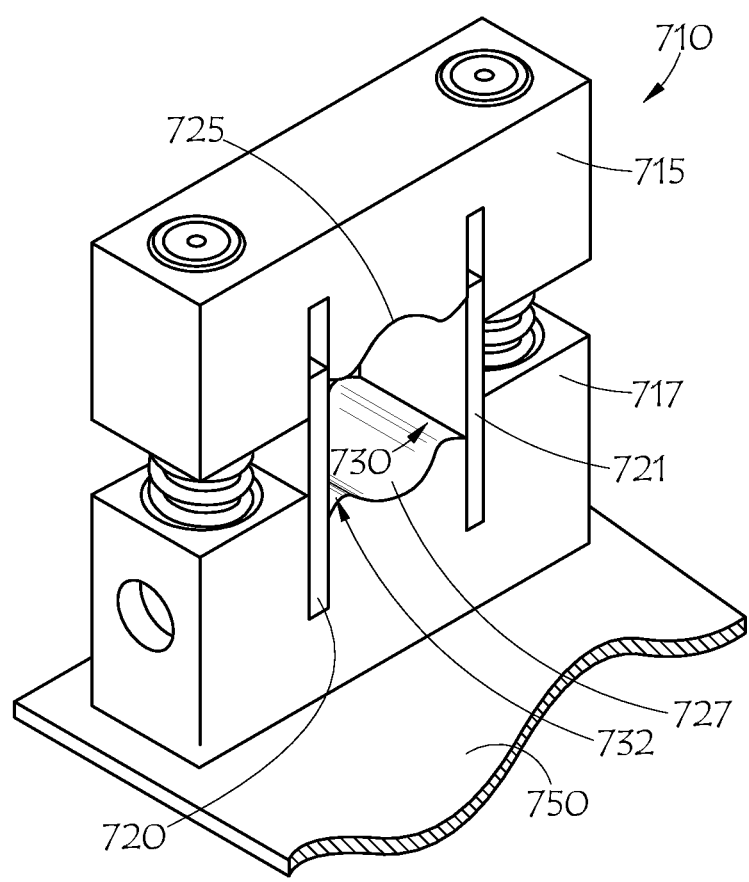
FIG. 9 is a partially fragmented perspective view of an open die set for use in a fluid conduit cover installation press.
Figure 10:
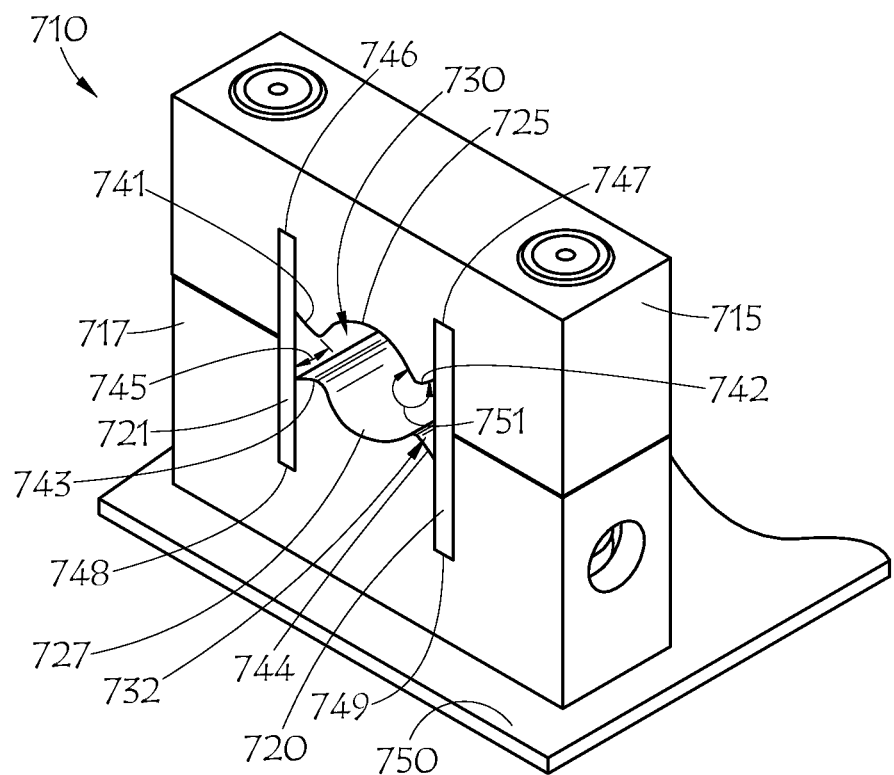
FIG. 10 is a partially fragmented perspective view of a closed die set for use in a fluid conduit cover installation press.
Figure 11:
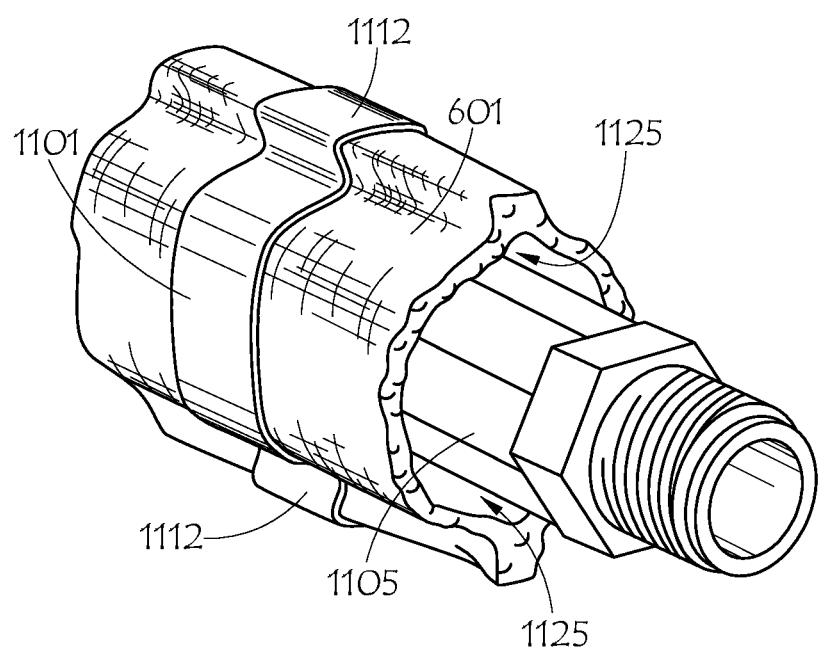
FIG. 11 is a fragmented perspective view of an end portion of a hose showing a sleeve crimped onto the hose in accordance with the present invention.

Turning now to FIGS. 7 through 11. Press 700 or 800 of FIGS. 7 and 8, respectively, or other compressive mechanisms, may be used in embodiments of this system for compressing collar 1101 (FIG. 11) with an end of sleeve 601 captured between collar 1101 and conduit 610, or coupling 1105 disposed on an end of the conduit. The press might be a mechanically operated press, such as press 700 of FIG. 7, employing mechanical leverage to compress dies 710 (FIGS. 9 and 10). In such a mechanical press embodiment, a torque calibrated handle, similar to a torque wrench, may be used to operate the press, in order to monitor the degree of compression applied to the collar. Alternatively, and in some cases preferably, a powered press, such as hydraulic press 800 of FIG. 8 might be used to compress dies 710. Regardless, the press employed preferably employs complementary die set 710 which defines at least one raised portion 1112 in collar 701 to provide a fluid flow passage 1125 from an interstitial space between conduit 610 and sleeve 601.

FIG. 9 is a perspective view of open die set 710, while FIG. 10 is a perspective view of die set 710 closed. Die set 710 is preferably made-up of a pair of generally complimentary dies 715 and 717. However, die set 710 could be made up of any number of dies adapted to provide the desired crimping of collar 1101. In the illustrated embodiment of FIGS. 7 and 8 thrust plates 720 and 721 may be indexed between dies 715 and 717 to maintain alignment of the dies. The dies themselves define a generally curved compressive face 725 and 727 which bears-on and compressed collar 1101 to secure sleeve 601 to hose 610 or fitting 1105. Each die also defines at least a portion of a cavity 730 and 732 used to form raised portion 1112 in collar 701 during compression of collar 701. Cavities 730 and 732 are illustrated as having a generally trapezoidal shape to facilitate formation of the raised portion shape shown in FIG. 11. However, raised portion 1112 could have any number of shapes, as long as a fluid flow passage from the interstitial space between conduit 610 and sleeve 601 is provided. Correspondingly cavities could have shapes to provide these alternative shapes. As illustrated thrust plates 720 and 721 may be disposed in thrust plate slots and operate to help define and retain collar raised portions 1112. Die set 710 is shown as being spring loaded. This facilitates use of the dies, for example providing opening of the dies following crimping to make removal of the crimped hose assembly from the press easier, and assisting retention of the dies in the press. The die set may be mounted to base plate 750 for ease of use with a press. The dies are described as "complementary" in that they cooperate to form the desired shape for a collar. The illustrated die set is a pair of dies having generally reflected shapes, each making up a half of the desired result shape of the collar.

Thus, in accordance with embodiments of the present invention a die set for completing assembly of a safety hose sleeve system, as shown in FIGS. 9 and 10, might include an upper die 715 having an upper curved compressive face 725 and a pair of upper recess walls 741 and 742, one extending contiguous from the upper compressive face 725 at a reflex angle to the upper compressive face at each end of the upper compressive face. Upper recess walls 741 and 742 define an upper wall of cavities 730 and 732, respectively. The upper die 715 also comprises a pair of upper thrust plate slots 746 and 747, each extending upward from an end of each of the upper recess walls, distal from the upper compressive face 725. The die set also preferably includes a lower die 717 defining a lower curved compressive face 727 and a pair of lower recess walls 743 and 744, one extending contiguous from the lower compressive face 727 at a reflex angle to the lower compressive face at each end of the lower compressive face. Lower recess walls 743 and 744 define a lower wall of cavities 730 and 732, respectively. The lower die 717 also comprises a pair of lower thrust plate slots 748 and 749, each extending downward from an end of each of the lower recess walls 743 and 744, distal from the lower compressive face 727. Thrust plates 721 and 720 extend from each lower thrust plate slot (748 and 749, respectively) into the corresponding upper thrust plate slot (746 and 747, respectively), across each cavity (730 and 732, respectively) at an acute angle to each of the upper recess walls (741 and 742, respectively), and at an acute angle to each of the lower recess walls (743 and 744, respectively), defining an outer abutment of each cavity. One of the four acute angles is indicated at 745 in FIG. 10. One of the four reflex angles is indicated at 751 in FIG. 10. "Acute" and "reflex" herein refers to interior angles of the cavity shape defined by the die set.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for installing a fluid conduit cover onto a conduit, comprising:
    said fluid conduit cover, said cover comprising a flattened tubular fabric sleeve;
    a sleeve guide comprising a body defining a generally symmetrical sleeve receptive passage therethrough, said passage comprising a transverse elongated slot with opposing guide channels defined in said passage and said guide channels located centrally with respect to the transverse elongated direction of said slot; and
    a plurality of lead rollers positioned at predetermined distances from said guide, with the axes of said lead rollers perpendicular to the slot, so that the sleeve may be positioned through said lead rollers with flattened edges of said sleeve indexed with said guide channels, and with a portion of said sleeve exiting said guide being open;
    wherein said sleeve guide and said plurality of lead rollers are mounted on a common surface.

2. The system of claim 1, further comprising:
    a ball disposed inside a portion of said sleeve after said lead rollers.

3. The system of claim 1 wherein the entrance opening of said passage is flared.

4. The system of claim 1 wherein said slot is tapered from an entrance of said guide to an outlet of said guide.

5. The system of claim 1 wherein said guide presses said edges of said sleeve together.

6. The system of claim 5 wherein at least one of said edges is a longitudinal fold or crease of said sleeve.

7. The system of claim 1 further comprising a heated device that cuts a length of said sleeve and fuses the fabric comprising said sleeve that has exited said guide.

8. The system of claim 1 further comprising: a collar; and a press for compressing said collar with an end of said sleeve captured between said collar and said conduit.

9. The system of claim 8 wherein said press employs complementary dies which define at least one raised portion in said collar.

10. The system of claim 1 further comprising: a collar; and a press for compressing said collar with an end of said sleeve captured between said collar and a coupling disposed on an end of said conduit.

11. The system of claim 10 wherein said press employs complementary dies which define at least one raised portion in said collar.

12. A method of using the system of claim 10 comprising:
    positioning said fabric sleeve and feeding said fabric sleeve through said lead rollers;
    pressing sleeve edges to flatten said sleeve against its normal geometry;
    aligning the flattened sleeve with said edges aligned with said opposing guide channels;
    feeding said sleeve through said passage of said sleeve guide;
    compressing said sleeve in said passage, letting the edges of the sleeve ride against the guide channels, said compressing opening said sleeve; and
    cutting a length of the compressed sleeve exiting said guide leaving an inside of said sleeve clear to receive the fluid conduit.

13. The method of claim 12, further comprising:
    inserting a ball inside said sleeve prior to said feeding.

14. The method of claim 12 wherein at least one of said edges is a longitudinal seam of said sleeve.

15. The method of claim 12 wherein at least one of said edges is a longitudinal fold or crease of said sleeve.

16. The method of claim 12 wherein said cutting comprises using a heated device that fuses the fabric comprising said sleeve around a circumference of said sleeve.

17. The method of claim 12 further comprising compressing a collar with an end of said sleeve captured between said collar and an end of said conduit.

18. The method of claim 17 wherein said compressing defines at least one raised portion in said collar.

* * * * *